US011178063B2

United States Patent
Guim Bernat et al.

(10) Patent No.: US 11,178,063 B2
(45) Date of Patent: Nov. 16, 2021

(54) REMOTE HARDWARE ACCELERATION

(71) Applicant: INTEL CORPORATION, Santa Clara, CA (US)

(72) Inventors: Francesc Guim Bernat, Barcelona (ES); Kshitij A. Doshi, Tempe, AZ (US); Mark A. Schmisseur, Phoenix, AZ (US); Narayan Ranganathan, Bangalore (IN); John Chun Kwok Leung, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 966 days.

(21) Appl. No.: 15/639,641

(22) Filed: Jun. 30, 2017

(65) Prior Publication Data

US 2019/0007334 A1    Jan. 3, 2019

(51) Int. Cl.
| | | |
|---|---|---|
| *H04L 12/911* | (2013.01) | |
| *G06F 13/40* | (2006.01) | |
| *H04L 12/40* | (2006.01) | |
| *G06F 9/455* | (2018.01) | |
| *H04L 29/08* | (2006.01) | |
| *H04L 12/413* | (2006.01) | |
| *H04L 12/927* | (2013.01) | |

(52) U.S. Cl.
CPC .......... *H04L 47/70* (2013.01); *G06F 9/45558* (2013.01); *G06F 13/4068* (2013.01); *H04L 12/40* (2013.01); *H04L 12/413* (2013.01); *H04L 47/781* (2013.01); *H04L 47/803* (2013.01); *H04L 67/025* (2013.01); *H04L 67/10* (2013.01); *H04L 67/1097* (2013.01); *H04L 67/12* (2013.01); *H04L 67/16* (2013.01); *H04L 67/2842* (2013.01); *G06F 2009/45595* (2013.01)

(58) Field of Classification Search
CPC ..... H04L 67/16; H04L 67/2842; H04L 12/40; H04L 12/413; H04L 67/10; H04L 47/781; H04L 67/12; H04L 47/803; H04L 67/025; H04L 67/1097; H04L 47/70; G06F 9/45558; G06F 2009/45595; G06F 13/4068
USPC ......................................................... 709/226
See application file for complete search history.

(56) References Cited

U.S. PATENT DOCUMENTS

| | | | | |
|---|---|---|---|---|
| 9,967,350 | B2* | 5/2018 | Rao ................. | H04L 41/0813 |
| 10,169,065 | B1* | 1/2019 | Nye ................. | H04L 67/28 |
| 10,180,809 | B2* | 1/2019 | Fetik ............... | G06F 3/0673 |
| 10,757,576 | B2* | 8/2020 | Ashrafi ............ | H04W 16/10 |
| 2016/0337179 | A1* | 11/2016 | Rao ................. | H04L 12/4633 |
| 2016/0337193 | A1* | 11/2016 | Rao ................. | H04L 45/64 |
| 2016/0380886 | A1* | 12/2016 | Blair ............... | H04L 45/50 |
| | | | | 398/49 |
| 2017/0206034 | A1* | 7/2017 | Fetik ............... | H04L 67/1097 |

(Continued)

OTHER PUBLICATIONS

Book: Network Processing Unit, NFV Infrastructure-Hardware Evolution and Testing by Ken Gray et al. in Network Function Virtualization, 2016.*

*Primary Examiner* — Frantz B Jean
(74) *Attorney, Agent, or Firm* — Patent Capital Group

(57) ABSTRACT

A host fabric interface (HFI) apparatus, including: an HFI to communicatively couple to a fabric; and a remote hardware acceleration (RHA) engine to: query an orchestrator via the fabric to identify a remote resource having an accelerator; and send a remote accelerator request to the remote resource via the fabric.

25 Claims, 10 Drawing Sheets

(56) References Cited

U.S. PATENT DOCUMENTS

| | | | |
|---|---|---|---|
| 2018/0026849 A1* | 1/2018 | Guim Bernat | G06F 16/2282 |
| | | | 709/223 |
| 2018/0114013 A1* | 4/2018 | Sood | G06F 21/572 |
| 2018/0293185 A1* | 10/2018 | Vembu | G06F 9/4881 |
| 2018/0331905 A1* | 11/2018 | Toledo | H04L 43/0882 |
| 2018/0376338 A1* | 12/2018 | Ashrafi | H04W 16/10 |

* cited by examiner

US 11,178,063 B2

REMOTE HARDWARE ACCELERATION

FIELD OF THE SPECIFICATION

This disclosure relates in general to the field of network computing, and more particularly, though not exclusively to, a system and method for remote hardware acceleration.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
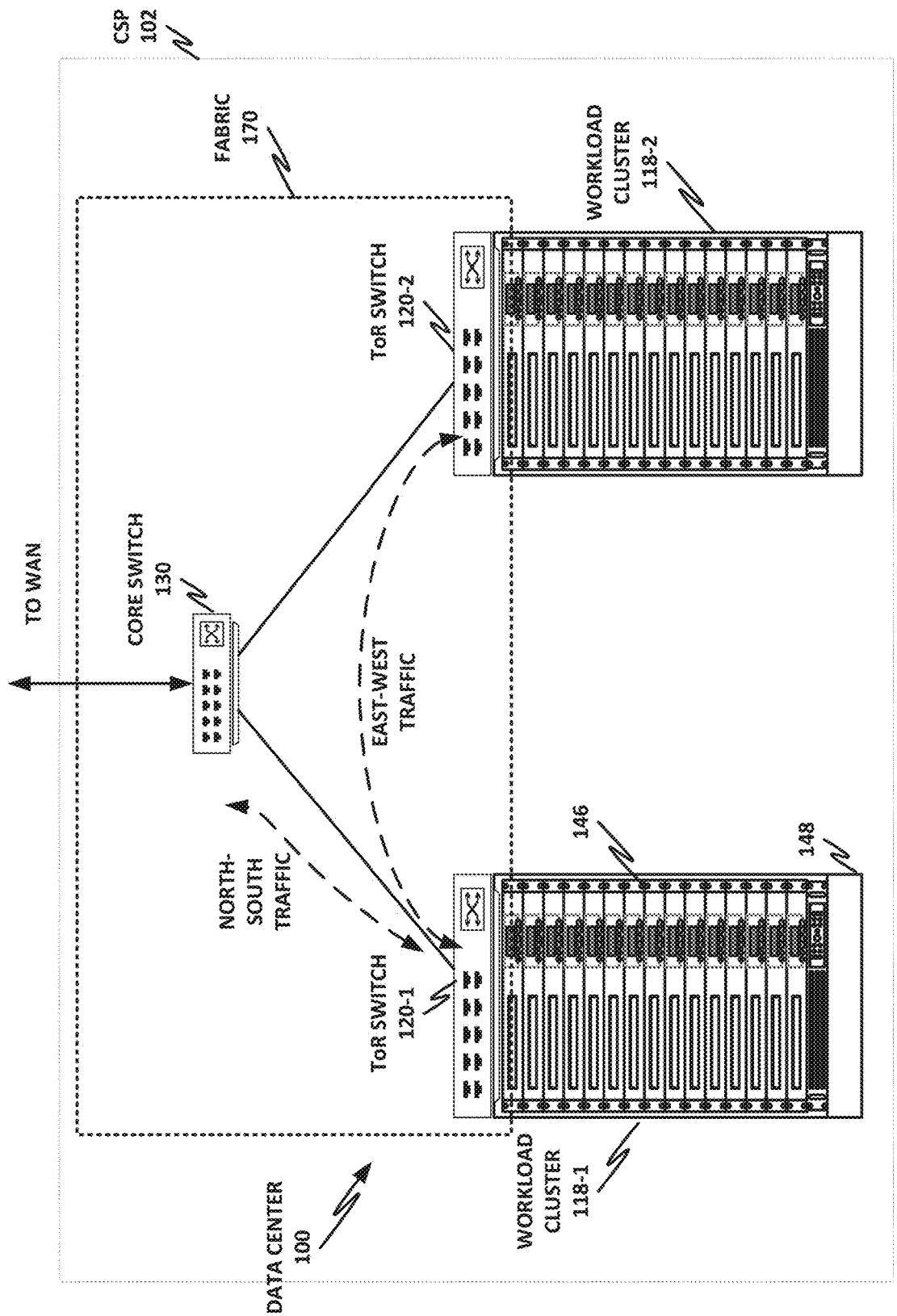
FIG. 1 is a network-level diagram of a data center of a cloud service provider, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary trend in computing, which has found particular application in data centers, is the use of certain hardware accelerators to supplement the function of a CPU. For example, Intel® Corporation provides Quick Assist Technology™ (QAT) which provides, in hardware, functions to assist the operation of a network interface controller (NIC) or Intel® Host Fabric Interface (HFI). These functions can include encryption, compression, inspection, and security features. In another example, Crystal Beach Direct Memory Access™ (CBDMA, also known as Intel® Quick-Data technology) by Intel® provides hardware assisted memory operations. For example, when a program needs to copy a large chunk of data from one memory location to another memory location, rather than require the CPU to iteratively run through all of the copy operations, a single command or short series of commands can be issued to the CBDMA and the CBDMA can then complete the batch memory operation. Additionally, CBDMA can fill a specific data pattern at a memory address, compare the contents of memory addresses for quality, and perform encryption and cryptographic processing of memory by way of nonlimiting example.

Such hardware accelerators provide advantages not only because the hardware-based algorithms can operate at much higher speeds than software algorithms, but also because the offloading of these functions frees up the processor to perform other work. Historically, such hardware acceleration technologies have been provided on-chip or on-board to a specific device. However, a very high speed and low latency fabric, such as those used in contemporary data centers, makes it feasible to provide remote access to such hardware acceleration technologies.

In a contemporary data center, a particular node may not live in isolation, but rather may be able to expose certain of its resources to other nodes in the data center, and conversely to access resources exposed by different nodes. Indeed, in some cases, a "node" is actually a composite node that is provisioned by a network controller or orchestrator, with the processor being on one physical node, memory on a second node, storage on a third node, and other resources such as FPGAs, ASICs, or accelerators located on yet other nodes.

Nodes may be able to expose resources via novel protocols, such as tunneling memory requests over fabric. Thus, nodes may have parts of their visible memory address space or other resources mapped to remote nodes or remote memory servers. A memory server may include a remote tray, sled, or rack consisting entirely or almost entirely of memory resources (as opposed to, for example, compute or storage resources). Memory servers may be used to provide high-end memory to the data center, which can be allocated to composite nodes on demand. Accelerators are one such resource that can be exposed to and shared with other nodes. Thus, the present specification discloses a method for registering accelerators to the fabric for access by other nodes, and methods for those other nodes to access those exposed accelerators.

A system and method for remote hardware acceleration will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a data center 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of a traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® HFI, a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect™ (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
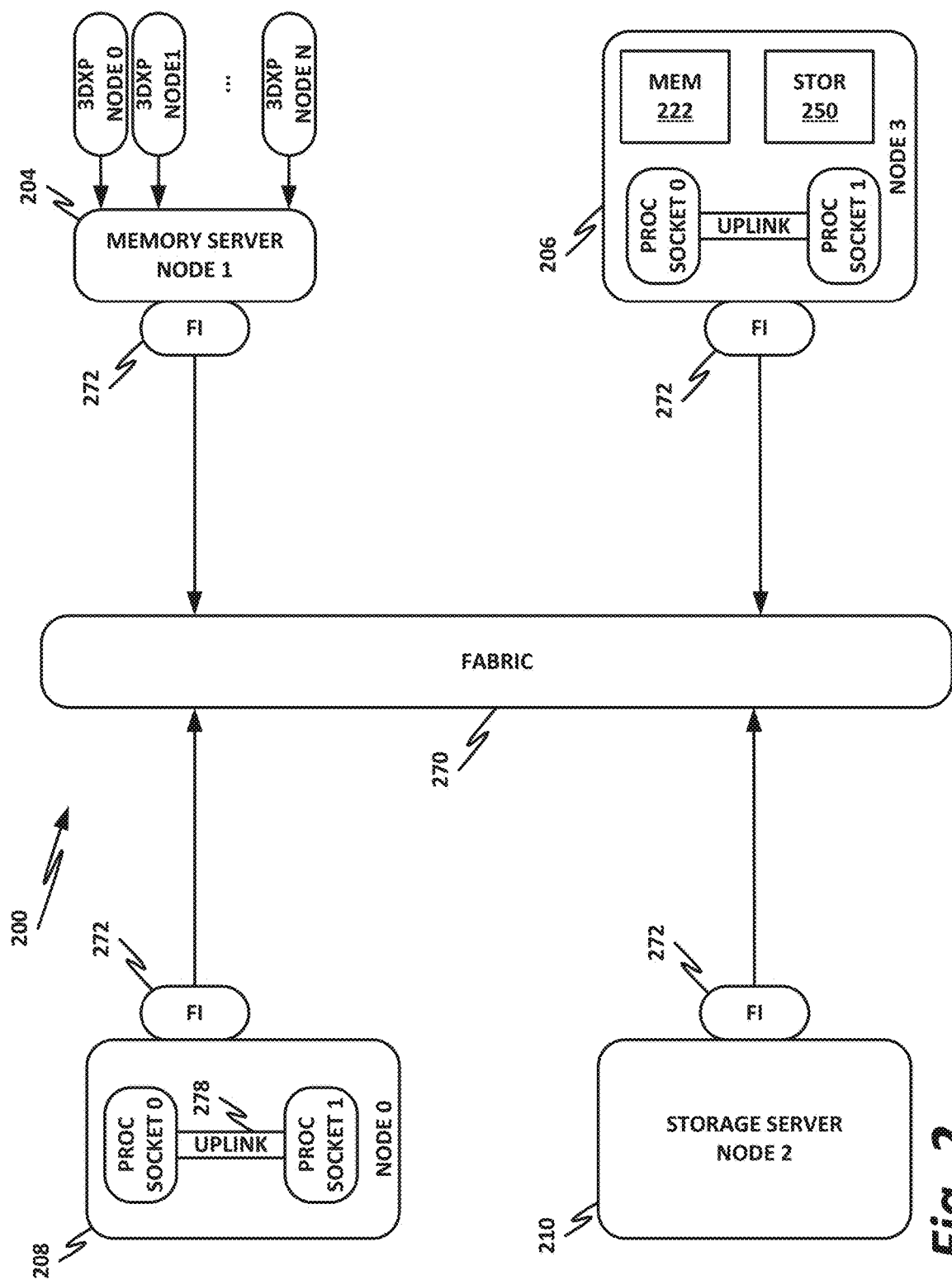
FIG. 2 is a block diagram of a data center according to one or more examples of the present specification.

FIG. 2 is a block diagram of a data center 200 according to one or more examples of the present specification. Data center 200 may be, in various embodiments, the same data center as data center 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout data center 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via an HFI 272, which provides fast communication that makes these technologies possible.

By way of further illustration, node 3 206 is also depicted. Node 3 206 also includes an HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
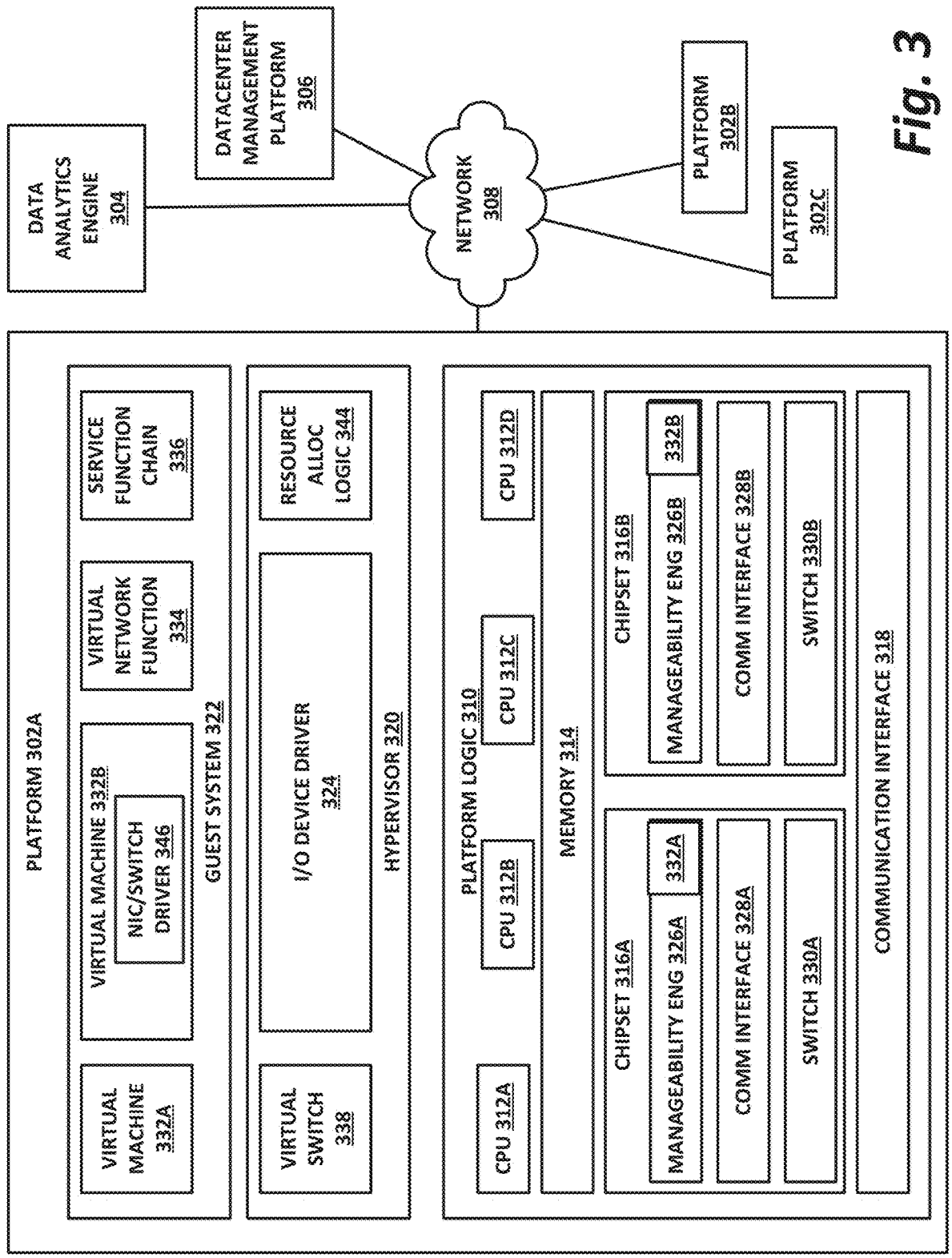
FIG. 3 illustrates a block diagram of components of a computing platform according to one or more examples of the present specification.

FIG. 3 illustrates a block diagram of components of a computing platform 302A according to one or more examples of the present specification. In the embodiment depicted, platforms 302A, 302B, and 302C, along with a data center management platform 306 and data analytics engine 304 are interconnected via network 308. In other embodiments, a computer system may include any suitable number of (i.e., one or more) platforms. In some embodiments (e.g., when a computer system only includes a single platform), all or a portion of the system management platform 306 may be included on a platform 302. A platform 302 may include platform logic 310 with one or more central processing units (CPUs) 312, memories 314 (which may include any number of different modules), chipsets 316, communication interfaces 318, and any other suitable hardware and/or software to execute a hypervisor 320 or other operating system capable of executing workloads associated with applications running on platform 302. In some embodiments, a platform 302 may function as a host platform for one or more guest systems 322 that invoke these applications. Platform 302A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 306, hypervisor 320, or other operating system) of computer platform 302A may assign hardware resources of platform logic 310 to perform workloads in accordance with the stress information. In some embodiments, self-diagnostic capabilities may be combined with the stress monitoring to more accurately determine the health of the hardware resources. Each platform 302 may include platform logic 310. Platform logic 310 comprises, among other logic enabling the functionality of platform 302, one or more CPUs 312, memory 314, one or more chipsets 316, and communication interfaces 328. Although three platforms are illustrated, computer platform 302A may be interconnected with any suitable number of platforms. In various embodiments, a platform 302 may reside on a circuit board that is installed in a chassis, rack, or other suitable structure that comprises multiple platforms coupled together through network 308 (which may comprise, e.g., a rack or backplane switch).

CPUs 312 may each comprise any suitable number of processor cores and supporting logic (e.g., uncores). The cores may be coupled to each other, to memory 314, to at least one chipset 316, and/or to a communication interface 318, through one or more controllers residing on CPU 312 and/or chipset 316. In particular embodiments, a CPU 312 is embodied within a socket that is permanently or removably coupled to platform 302A. Although four CPUs are shown, a platform 302 may include any suitable number of CPUs.

Memory 314 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 314 may be used for short, medium, and/or long term storage by platform 302A. Memory 314 may store any suitable data or information utilized by platform logic 310, including software embedded in a computer readable medium, and/or encoded logic incorporated in hardware or otherwise stored (e.g., firmware). Memory 314 may store data that is used by cores of CPUs 312. In some embodiments, memory 314 may also comprise storage for instructions that may be executed by the cores of CPUs 312 or other processing elements (e.g., logic resident on chipsets 316) to provide functionality associated with the manageability engine 326 or other components of platform logic 310. A platform 302 may also include one or more chipsets 316 comprising any suitable logic to support the operation of the CPUs 312. In various embodiments, chipset 316 may reside on the same die or package as a CPU 312 or on one or more different dies or packages. Each chipset may support any suitable number of CPUs 312. A chipset 316 may also include one or more controllers to couple other components of platform logic 310 (e.g., communication interface 318 or memory 314) to one or more CPUs. In the embodiment depicted, each chipset 316 also includes a manageability engine 326. Manageability engine 326 may include any suitable logic to support the operation of chipset 316. In a particular embodiment, a manageability engine 326 (which may also be referred to as an innovation engine) is capable of collecting real-time telemetry data from the chipset 316, the CPU(s) 312 and/or memory 314 managed by the chipset 316, other components of platform logic 310, and/or various connections between components of platform logic 310. In various embodiments, the telemetry data collected includes the stress information described herein.

In various embodiments, a manageability engine 326 operates as an out-of-band asynchronous compute agent which is capable of interfacing with the various elements of platform logic 310 to collect telemetry data with no or minimal disruption to running processes on CPUs 312. For example, manageability engine 326 may comprise a dedicated processing element (e.g., a processor, controller, or other logic) on chipset 316, which provides the functionality of manageability engine 326 (e.g., by executing software instructions), thus conserving processing cycles of CPUs 312 for operations associated with the workloads performed by the platform logic 310. Moreover the dedicated logic for the manageability engine 326 may operate asynchronously with respect to the CPUs 312 and may gather at least some of the telemetry data without increasing the load on the CPUs.

A manageability engine 326 may process telemetry data it collects (specific examples of the processing of stress information will be provided herein). In various embodiments, manageability engine 326 reports the data it collects and/or the results of its processing to other elements in the computer system, such as one or more hypervisors 320 or other operating systems and/or system management software (which may run on any suitable logic such as system management platform 306). In particular embodiments, a critical event such as a core that has accumulated an excessive amount of stress may be reported prior to the normal interval for reporting telemetry data (e.g., a notification may be sent immediately upon detection).

Additionally, manageability engine 326 may include programmable code configurable to set which CPU(s) 312 a particular chipset 316 will manage and/or which telemetry data will be collected.

Chipsets 316 also each include a communication interface 328. Communication interface 328 may be used for the communication of signaling and/or data between chipset 316 and one or more I/O devices, one or more networks 308, and/or one or more devices coupled to network 308 (e.g., system management platform 306). For example, communication interface 328 may be used to send and receive network traffic such as data packets. In a particular embodiment, a communication interface 328 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 316 (e.g., manageability engine 326 or switch 330) and another device coupled to network 308. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 328 may allow communication of data (e.g., between the manageability engine 326 and the data center management platform 306) associated with management and monitoring functions performed by manageability engine 326. In various embodiments, manageability engine 326 may utilize elements (e.g., one or more NICs) of communication interfaces 328 to report the telemetry data (e.g., to system management platform 306) in order to reserve usage of NICs of communication interface 318 for operations associated with workloads performed by platform logic 310.

Switches 330 may couple to various ports (e.g., provided by NICs) of communication interface 328 and may switch data between these ports and various components of chipset 316 (e.g., one or more Peripheral Component Interconnect Express (PCIe) lanes coupled to CPUs 312). Switches 330 may be a physical or virtual (i.e., software) switch.

Platform logic 310 may include an additional communication interface 318. Similar to communication interfaces 328, communication interfaces 318 may be used for the communication of signaling and/or data between platform logic 310 and one or more networks 308 and one or more devices coupled to the network 308. For example, communication interface 318 may be used to send and receive network traffic such as data packets. In a particular embodiment, communication interfaces 318 comprise one or more physical NICs. These NICs may enable communication between any suitable element of platform logic 310 (e.g., CPUs 512 or memory 514) and another device coupled to network 308 (e.g., elements of other platforms or remote computing devices coupled to network 308 through one or more networks).

Platform logic 310 may receive and perform any suitable types of workloads. A workload may include any request to utilize one or more resources of platform logic 310, such as one or more cores or associated logic. For example, a workload may comprise a request to instantiate a software component, such as an I/O device driver 324 or guest system 322; a request to process a network packet received from a virtual machine 332 or device external to platform 302A (such as a network node coupled to network 308); a request to execute a process or thread associated with a guest system 322, an application running on platform 302A, a hypervisor 320 or other operating system running on platform 302A; or other suitable processing request.

A virtual machine 332 may emulate a computer system with its own dedicated hardware. A virtual machine 332 may run a guest operating system on top of the hypervisor 320. The components of platform logic 310 (e.g., CPUs 312, memory 314, chipset 316, and communication interface 318) may be virtualized such that it appears to the guest operating system that the virtual machine 332 has its own dedicated components.

A virtual machine 332 may include a virtualized NIC (vNIC), which is used by the virtual machine as its network interface. A vNIC may be assigned a media access control (MAC) address or other identifier, thus allowing multiple virtual machines 332 to be individually addressable in a network.

VNF 334 may comprise a software implementation of a functional building block with defined interfaces and behavior that can be deployed in a virtualized infrastructure. In particular embodiments, a VNF 334 may include one or more virtual machines 332 that collectively provide specific functionalities (e.g., wide area network (WAN) optimization, virtual private network (VPN) termination, firewall operations, load-balancing operations, security functions, etc.). A VNF 334 running on platform logic 310 may provide the same functionality as traditional network components implemented through dedicated hardware. For example, a VNF 334 may include components to perform any suitable NFV workloads, such as virtualized evolved packet core (vEPC) components, mobility management entities, 3rd Generation Partnership Project (3GPP) control and data plane components, etc.

SFC 336 is a group of VNFs 334 organized as a chain to perform a series of operations, such as network packet processing operations. Service function chaining may provide the ability to define an ordered list of network services (e.g. firewalls, load balancers) that are stitched together in the network to create a service chain.

A hypervisor 320 (also known as a virtual machine monitor) may comprise logic to create and run guest systems 322. The hypervisor 320 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 310. Services of hypervisor 320 may be provided by virtualizing in software or through hardware assisted resources that require minimal software intervention, or both. Multiple instances of a variety of guest operating systems may be managed by the hypervisor 320. Each platform 302 may have a separate instantiation of a hypervisor 320.

Hypervisor 320 may be a native or bare-metal hypervisor that runs directly on platform logic 310 to control the platform logic and manage the guest operating systems. Alternatively, hypervisor 320 may be a hosted hypervisor that runs on a host operating system and abstracts the guest operating systems from the host operating system. Hypervisor 320 may include a virtual switch 338 that may provide virtual switching and/or routing functions to virtual machines of guest systems 322. The virtual switch 338 may comprise a logical switching fabric that couples the vNICs of the virtual machines 332 to each other, thus creating a virtual network through which virtual machines may communicate with each other.

Virtual switch 338 may comprise a software element that is executed using components of platform logic 310. In various embodiments, hypervisor 320 may be in communication with any suitable entity (e.g., a SDN controller) which may cause hypervisor 320 to reconfigure the parameters of virtual switch 338 in response to changing conditions in platform 302 (e.g., the addition or deletion of virtual machines 332 or identification of optimizations that may be made to enhance performance of the platform).

Hypervisor 320 may also include resource allocation logic 344, which may include logic for determining allocation of platform resources based on the telemetry data (which may include stress information). Resource allocation logic 344 may also include logic for communicating with various components of platform logic 310 entities of platform 302A to implement such optimization, such as components of platform logic 310.

Any suitable logic may make one or more of these optimization decisions. For example, system management platform 306; resource allocation logic 344 of hypervisor 320 or other operating system; or other logic of computer platform 302A may be capable of making such decisions. In various embodiments, the system management platform 306 may receive telemetry data from and manage workload placement across multiple platforms 302. The system management platform 306 may communicate with hypervisors 320 (e.g., in an out-of-band manner) or other operating systems of the various platforms 302 to implement workload placements directed by the system management platform.

The elements of platform logic 310 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 302A may be coupled together in any suitable manner such as through one or more networks 308. A network 308 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 4:
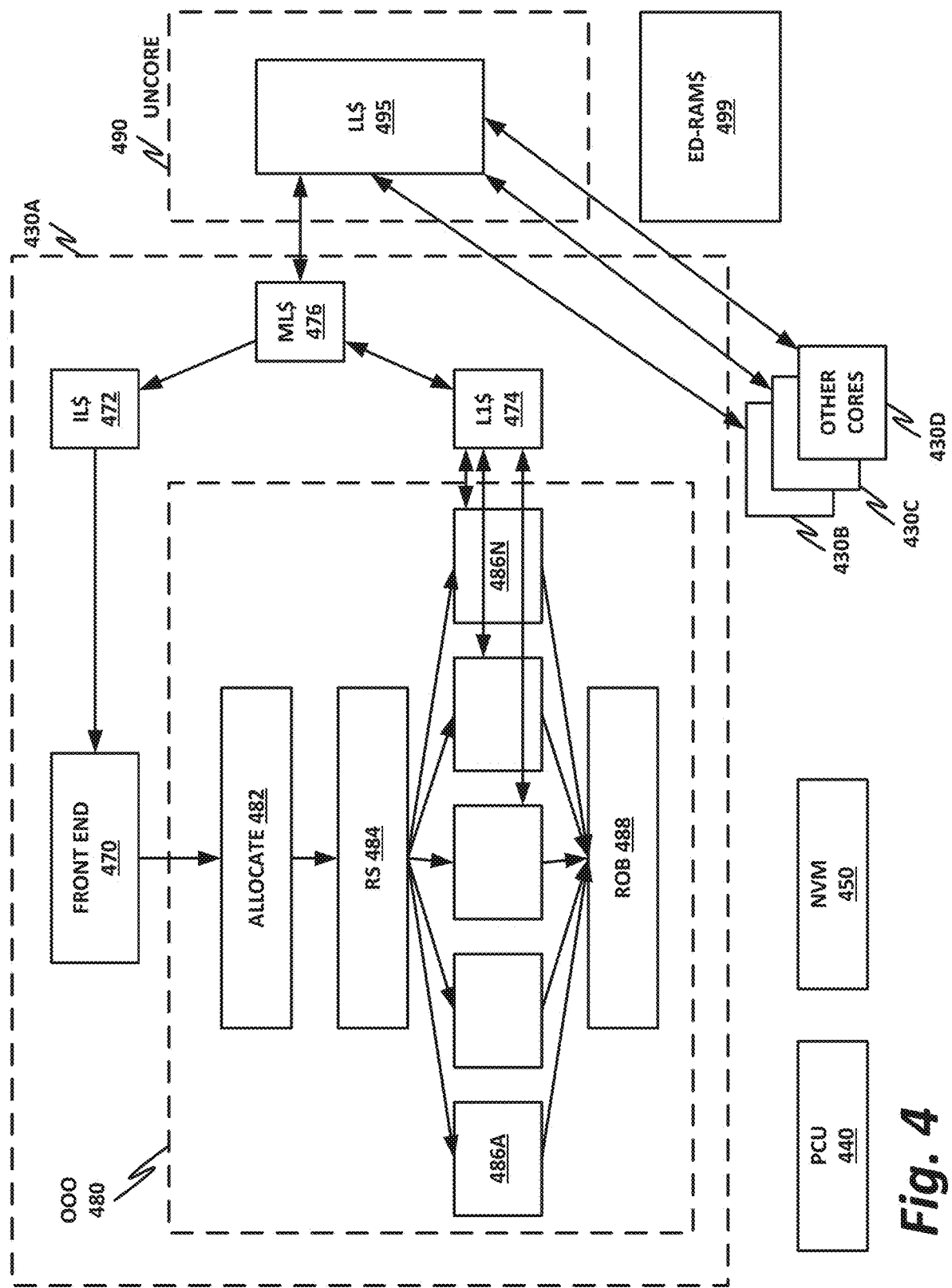
FIG. 4 illustrates a block diagram of a central processing unit (CPU) in accordance with certain embodiments.

FIG. 4 illustrates a block diagram of a central processing unit (CPU) 412 in accordance with certain embodiments. Although CPU 412 depicts a particular configuration, the cores and other components of CPU 412 may be arranged in any suitable manner. CPU 412 may comprise any processor or processing device, such as a microprocessor, an embedded processor, a digital signal processor (DSP), a network processor, an application processor, a co-processor, a system on a chip (SOC), or other device to execute code. CPU 412, in the depicted embodiment, includes four processing elements (cores 430 in the depicted embodiment), which may include asymmetric processing elements or symmetric processing elements. However, CPU 412 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 430A includes an out-of-order processor that has a front end unit 470 used to fetch incoming instructions, perform various processing (e.g. caching, decoding, branch predicting, etc.) and passing instructions/operations along to an out-of-order (OOO) engine. The OOO engine performs further processing on decoded instructions.

A front end 470 may include a decode module coupled to fetch logic to decode fetched elements. Fetch logic, in one embodiment, includes individual sequencers associated with thread slots of cores 430. Usually a core 430 is associated with a first ISA, which defines/specifies instructions executable on core 430. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 430, in one embodiment, recognize the same ISA (or a subset thereof). Alternatively, in a heterogeneous core environment, a decoder of one or more cores (e.g., core 430B) may recognize a second ISA (either a subset of the first ISA or a distinct ISA).

In the embodiment depicted, the out-of-order engine includes an allocate unit 482 to receive decoded instructions, which may be in the form of one or more micro-instructions or uops, from front end unit 470, and allocate them to appropriate resources such as registers and so forth. Next, the instructions are provided to a reservation station 484, which reserves resources and schedules them for execution on one of a plurality of execution units 486A-486N. Various types of execution units may be present, including, for example, arithmetic logic units (ALUs), load and store units, vector processing units (VPUs), floating point execution units, among others. Results from these different execution units are provided to a reorder buffer (ROB) 488, which take unordered results and return them to correct program order.

In the embodiment depicted, both front end unit 470 and out-of-order engine 480 are coupled to different levels of a memory hierarchy. Specifically shown is an instruction level cache 472, that in turn couples to a mid-level cache 476, that in turn couples to a last level cache 495. In one embodiment, last level cache 495 is implemented in an on-chip (sometimes referred to as uncore) unit 490. Uncore 490 may communicate with system memory 499, which, in the illustrated embodiment, is implemented via embedded DRAM (eDRAM). The various execution units 686 within OOO engine 480 are in communication with a first level cache 474 that also is in communication with mid-level cache 476. Additional cores 430B-430D may couple to last level cache 495 as well.

In particular embodiments, uncore 490 may be in a voltage domain and/or a frequency domain that is separate from voltage domains and/or frequency domains of the cores. That is, uncore 490 may be powered by a supply voltage that is different from the supply voltages used to power the cores and/or may operate at a frequency that is different from the operating frequencies of the cores.

CPU 412 may also include a power control unit (PCU) 440. In various embodiments, PCU 440 may control the supply voltages and the operating frequencies applied to each of the cores (on a per-core basis) and to the uncore. PCU 440 may also instruct a core or uncore to enter an idle state (where no voltage and clock are supplied) when not performing a workload.

In various embodiments, PCU 440 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 440 may detect stress characteristics at any suitable interval.

In various embodiments, PCU 440 is a component that is discrete from the cores 430. In particular embodiments, PCU 440 runs at a clock frequency that is different from the clock frequencies used by cores 630. In some embodiments where the PCU is a microcontroller, PCU 440 executes instructions according to an ISA that is different from an ISA used by cores 430.

In various embodiments, CPU 412 may also include a nonvolatile memory 450 to store stress information (such as stress characteristics, incremental stress values, accumulated stress values, stress accumulation rates, or other stress information) associated with cores 430 or uncore 490, such that when power is lost, the stress information is maintained.

Figure 5:
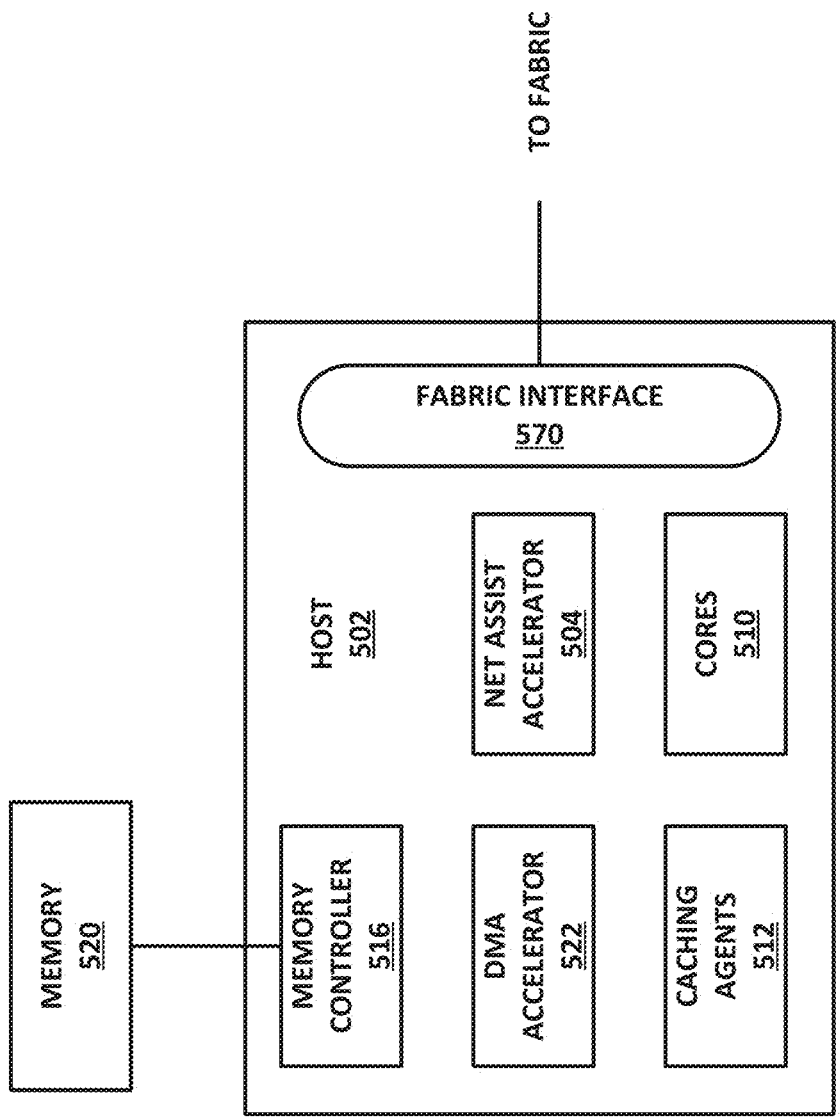
FIG. 5 is a block diagram of a host that may operate within a data center, according to one or more examples of the present specification.

FIG. 5 is a block diagram of a host 502 that may operate within a data center, such as data center 100 or data center 200 according to one or more examples of the present specification.

In this example, host 502 may be a compute node that operates on the data center, and couples to a fabric via HFI 570. Host 502 includes one or more cores 510 and one or more caching agents 512 that enable cores 510 to perform cached memory operations. A memory controller 516 communicatively couples host 502 to a memory 520, which in various examples may be a local memory, or may be a remotely accessed memory, accessed via memory controller 570.

In this example, host 502 also includes a network assist accelerator 504 and a DMA accelerator 522. Both network assist accelerator 504 and DMA accelerator 522 may be special ASICs, FPGAs, coprocessors (programmed, for example, via a ROM, cache or other local fast memory), or other specialized circuits that provide hardware assisted algorithms to increase the speed of certain common operations, and to free up cores 510 from having to perform those operations. As used throughout this specification, a "hardware accelerator" or "accelerator" should be broadly understood to include any accelerator that conforms to the foregoing description. Some hardware accelerators may be referred to as "hardware only" accelerators, meaning that they are not primarily software programmable (like a coprocessor), but rather perform their compute functions primarily in hardware.

As an example, DMA accelerator 522 may be a CBDMA chip, which provides specialized network functions as described above, such as copying blocks of memory, comparing memory locations or blocks of memory, or performing encryption on blocks of memory. CBDMA is disclosed by way of nonlimiting example only, and it should be understood that DMA accelerator 512 may represent any suitable hardware memory acceleration chip.

Similarly, network assist accelerator 504 may be any suitable network accelerator, such as Intel® Quick Assist Technology. Network assist accelerator 504 may perform repetitive or common functions at hardware speeds, including, for example, encryption or decryption, compression, deep packet inspection, security scans, or other network functions. In this respect, network assist accelerator 504 assists HFI 570 and cores 510, by increasing the throughput via HFI 570, and increasing or eliminating the need for cores 570 to perform those functions in software.

Figure 6:
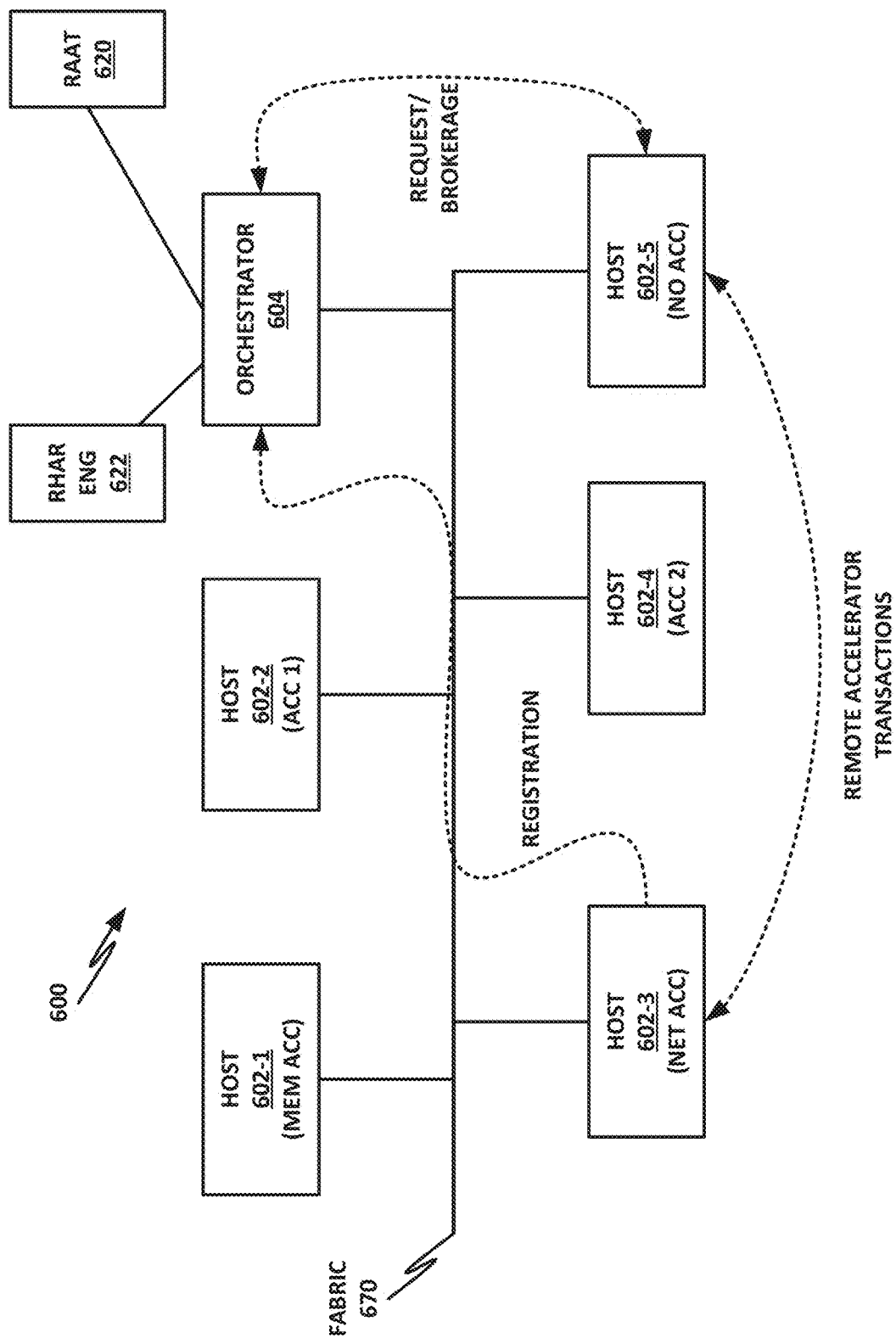
FIG. 6 is a block diagram of a data center according to one or more examples of the present specification.

FIG. 6 is a block diagram of a data center 600 according to one or more examples of the present specification. Note that data center 600 may be the same or different from data center 100 of FIG. 1 and data center 200 of FIG. 2.

In this example, data center 600 includes a plurality of hosts 602 which may be communicatively coupled via fabric 670. Data center 600 also includes an orchestrator 604, which may be or which may cooperate with a software defined networking (SDN) orchestrator, a virtual machine manager, a hypervisor, or some other controller or data center software technology.

In this illustration, orchestrator 604 is described with respect to certain limited functions that are drawn to aspects of the present specification. However, this should not be construed to imply that orchestrator 604 is necessarily a dedicated remote hardware acceleration (RHA) orchestrator, or is otherwise limited to the examples illustrated here. Many orchestrators and controllers are known, and their functions may be integrated with the RHA orchestrator functions disclosed herein, or orchestrator 604 may be a dedicated RHA orchestrator, and could include its own hardware accelerators that help provide high-speed RHA services.

In example data center 600 of FIG. 6, various hosts 602 have different acceleration capabilities. For example, host 602-1 includes a memory accelerator. Indeed, host 602-1 may be a dedicated memory server that not only provides hardware memory acceleration, but also serves memory to other nodes in the data center.

Host 602-2 includes an accelerator labeled as accelerator 1, which may provide any suitable acceleration technology. The specific examples of network assist technologies and memory acceleration are disclosed herein as illustrative examples of hardware acceleration functions. But in a general sense, many types of functions that are performed on a computing device are candidates for acceleration. In particular, any function that a device performs repetitively or regularly, and especially one that is compute intensive, is a good candidate for hardware acceleration.

Host 602-3 includes a network accelerator, such as Intel® Quick Assist Technology™. An example of such a network accelerator is disclosed, for example, as network assist accelerator 504 of FIG. 5.

Host 602-4 includes accelerator 2, which as described above, maybe any suitable kind of hardware accelerator.

Finally, host 602-5 has no hardware accelerators installed thereon.

By way of example, host 602-5, which has no hardware acceleration capabilities, may benefit from accessing the network accelerator of host 602-3. First, host 602-3, which includes a network accelerator, may register with orchestrator 604.

Orchestrator 604 may provide a remote hardware acceleration registration (RHAR) engine 622, and a remotely accessible accelerator table (RAAT) 620. RHAH 622 may be any suitable engine, as described herein. As used throughout this specification, an "engine" includes any combination of one or more logic elements, of similar or dissimilar species, operable for and configured to perform one or more methods or functions of the engine. In some cases, the engine may include a special integrated circuit designed to carry out a method or a part thereof, and may also include software instructions operable to instruct a processor to perform the method. And engine may also include other hardware and software, including configuration files, registry entries, and interactive or user-mode software by way of non-limiting example. In one example, an engine includes executable instructions stored on a non-transitory medium operable to perform a method according to this specification.

RHAR engine 622 may provide registration service, such as by accepting via fabric 670 registrations of accelerators available for remote hardware acceleration. This may include information such as the identity and/or location of the node hosting the accelerator, and interfaces for providing remote acceleration requests.

RAAT 620 may be a local store of registered remotely accessible accelerators, including appropriate interfaces for those accelerators. For example, RAAT 620 may include a field that indicates that host 602-3 provides a network accelerator, and may also include a profile for providing an appropriate interface for accessing the network accelerator of host 602-3. In various examples, host 602-3 may be identified in RAAT 620 by any suitable identifier, such as an IP address, MAC address, hostname, or other locally unique identifier. Similarly, the network accelerator of host 602-3 may be identified by a macro or string that identifies it as a network accelerator. Appended to this table entry may be an interface profile, providing information on the number, type, and order of parameters that are required for accessing the network accelerator, as well as any special instructions about formatting or data types.

Once host 602-3 registers its network accelerator with orchestrator 604, orchestrator 604 makes an entry into RAAT 620 indicating the availability of the network accelerator.

An application running on host 602-5 may determine that it requires or would benefit from network acceleration services. Thus, host 602-5 queries orchestrator 604 via fabric 670, asking for availability of any network accelerators. In certain embodiments, the logic for providing such a discovery request may be provided on the HFI of host 602-5. Thus, a processor of host 602-5 may send a request to its HFI for network acceleration, and the fabric sends a discovery request to orchestrator 604.

Upon receiving the discovery request, orchestrator 604 queries RAAT 620 to determine the availability of any network accelerators. In this case, orchestrator 604 determines that host 602-3 has an available network accelerator. Orchestrator 604 also extracts from RAAT 620 the appropriate interface information for the network accelerator. Orchestrator 604 then returns this information to host 602-5 via fabric 670.

Once host 602-5 has queried orchestrator 604 and determined that a network accelerator is available on host 602-3, it is no longer necessary for orchestrator 604 to broker the remote hardware acceleration services between host 602-5 and host 602-3. Rather, to reduce latency and increase speed, host 602-5 and host 602-3 may communicate directly with each other via fabric 670.

In this example, host 602-5 sends a remote acceleration request to host 602-3 via fabric 670, with an appropriately formatted payload as defined by the interface for the network accelerator.

Host 602-3 receives the remote acceleration request, and the HFI of host 602-3 may validate the request, such as ensuring that the request is from a valid host, and that the request is formatted properly. After formatting the request, the HFI may forward the remote acceleration request to the appropriate accelerator of host 602-3.

The network accelerator of host 602-3 performs the appropriate processing on the request payload, and returns results to its HFI. The HFI of host 602-3 then returns the results to host 602-5 via fabric 670.

The HFI of host 602-5 receives the acknowledgment of the request, along with the results payload. The HFI then forwards the results to the appropriate hardware or software on the core of host 602-5.

Advantageously, this scheme requires minimal changes to the CPU architecture. From the perspective of the core of host 602-5, it can access the remote hardware accelerator as though it were a local resource. The HFI of host 602-5 can expose remotely accessible accelerators as local accelerator resources.

Similarly, the HFI of host 602-3 can forward requests to the network accelerator as though they were locally generated requests. The network accelerator of host 602-3 does not need to know whether the request was generated locally or remotely. The HFIs allow these communications to be handled seamlessly.

In certain embodiments, a "discovery flow" may also be provided. In an embodiment, the HFI, fabric flow, and memory controller may be extended to provide a method for application to discover which acceleration functions each accelerator of a given node exposes. Each of the node memory agents may register to the HFI the UUID memory operations supported by the accelerator. This may be registered, for example, via a pcode. This information, stored locally in the HFIC, can be accessed by remote nodes through a novel fabric flow. This flow allows an application to discover if an acceleration operation or a list of operations are currently supported by a given node. The remote HFI may respond with the memory operations that each of the memory controllers support. Alternatively, all operations supported by a remote node can be requested.

By way of example, a core on Node 2 (e.g., host 602-3) is coupled to one or more accelerators, and registers those accelerators to Node 2 HFI. Node 2 HFI may issues ACKs to the one or more accelerators. A core on Node 1 (e.g., host 602-5), issues an enquiry (ENQ©Desc) to its HFI. The HFI issues STLDiscoveryRemoteAcc, with a list of UUIDs (or a request for all UUIDs), which is forwarded via the fabric to Node 2 (e.g., host 602-3) HFI. Node 2 HFI responds with a response value revealing the available accelerators.

Figure 7:
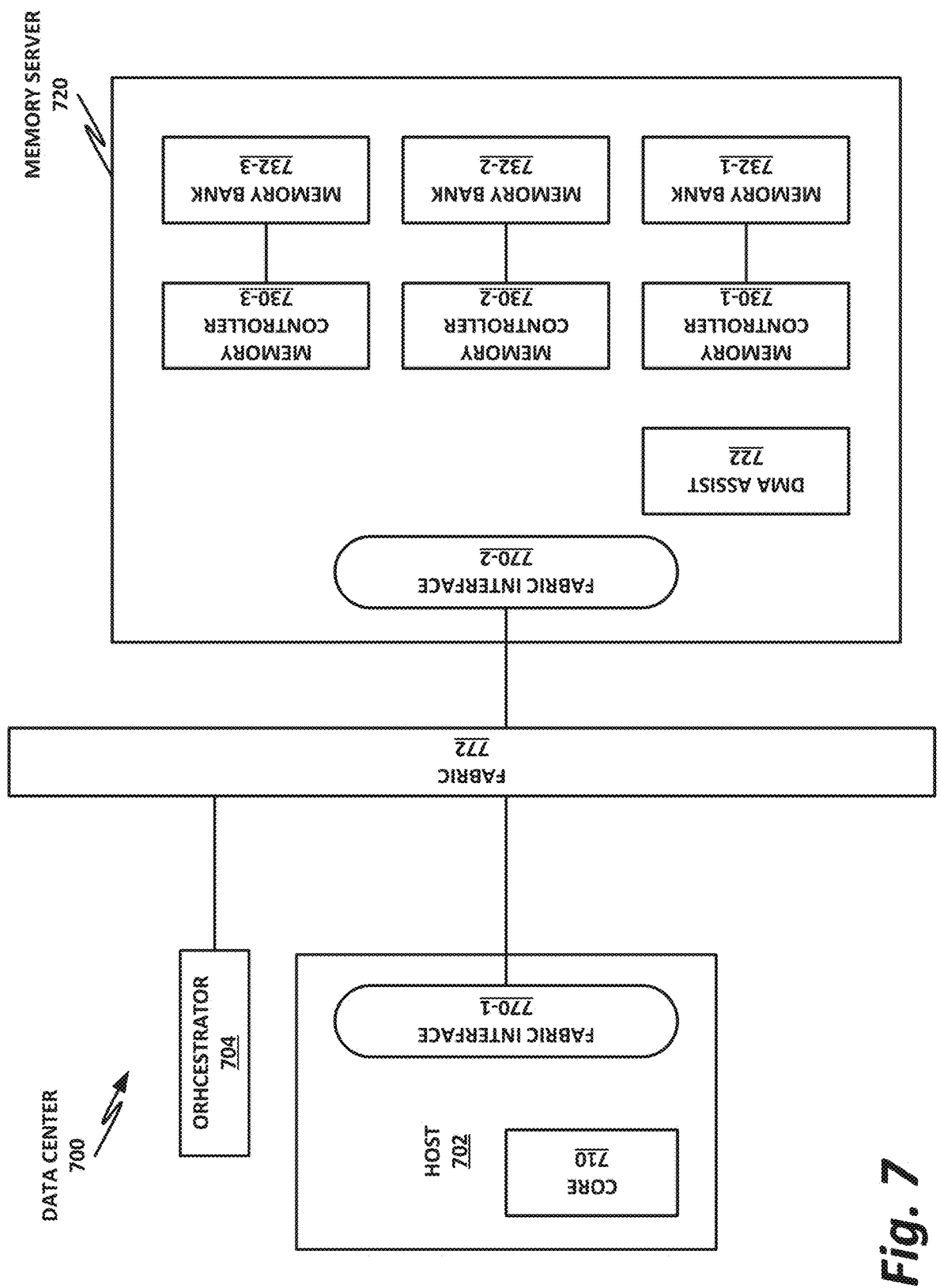
FIG. 7 illustrates an example of remote hardware acceleration according to one or more examples of the present specification.

FIG. 7 illustrates another example of remote hardware acceleration according to one or more examples of the present specification.

In the example of FIG. 7, a data center 700 is illustrated. As before, data center 700 may be the same data center or different from data centers 100 of FIG. 1, 200 of FIG. 2, or 600 of FIG. 6. In this example, host 702 is operating from a memory server 720, which provides a large amount of high-speed memory dynamically provisioned to meet the needs of host 702, and other hosts within data center 700. As before, host 702 accesses memory server 720 via fabric 722. Host 702 has an HFI 770-1, while host memory server 720 includes HFI 770-2.

Memory server 720 includes a plurality of memory controllers 730-1, 730-2, and 730-3 communicatively coupled to a plurality of memory banks 732-1, 732-2, and 732-3 respectively. In this example, memory server 720 also includes a hardware DMA assist technology, such as Intel® CBDMA. As described above, DMA assistant 722 can perform large or bulk memory operations with little or no intervention from a core such as core 710 of host 702.

In this example, core 710 may be running software that requires a complicated memory operation, such as a bulk memory move.

As illustrated in FIG. 6, memory server 720 may register DMA assist 722 with an orchestrator 704. Once memory server 720 registers DMA assist 722 with orchestrator 704, DMA assist 722 may be visible as a shared resource on fabric 772.

Thus, when core 710 needs to perform complex or processor intensive memory operations, core 710 may query orchestrator 704 to find a memory server 720 with an available DMA assist 722. Host 702 discovers via orchestrator 704 that memory server 720 has an exposed DMA assist 722. Core 710 may then issue a properly formatted DMA operation via HFI 770-1. HFI 770-1 forwards the request via fabric 772 to HFI 770-2. HFI 770-2 forwards the request to DMA assist 722. DMA assist 722 may then perform the large or complex memory operation, such as moving a large block of memory from memory banks 732-1 via memory controller 730-1 to memory bank 732-3 via memory controller 730-3. DMA assist 722 can perform this operation autonomously without further input from core 710. Thus, while this large memory operation is being performed, core 710 can be working on other processing tasks.

Without the aid of a remote hardware accelerator, to move a large block of memory from memory bank 732-1 to memory bank 732-3, core 710 would have to fetch the memory via fabric 772 into its local cache or memory, and then write the memory out via fabric 772 to memory bank 732-3. This would be much less efficient and much more time-consuming. Furthermore, while performing this task, core 710 may be wholly occupied with the task, and may not be free to perform other processing tasks.

Note that the preceding example illustrates an example wherein accelerators are centrally registered with the orchestrator. But it is also possible for accelerators to register to their HFIs, and for nodes to discover available accelerators directly, as illustrated in paragraph [0106] above.

Figure 8:
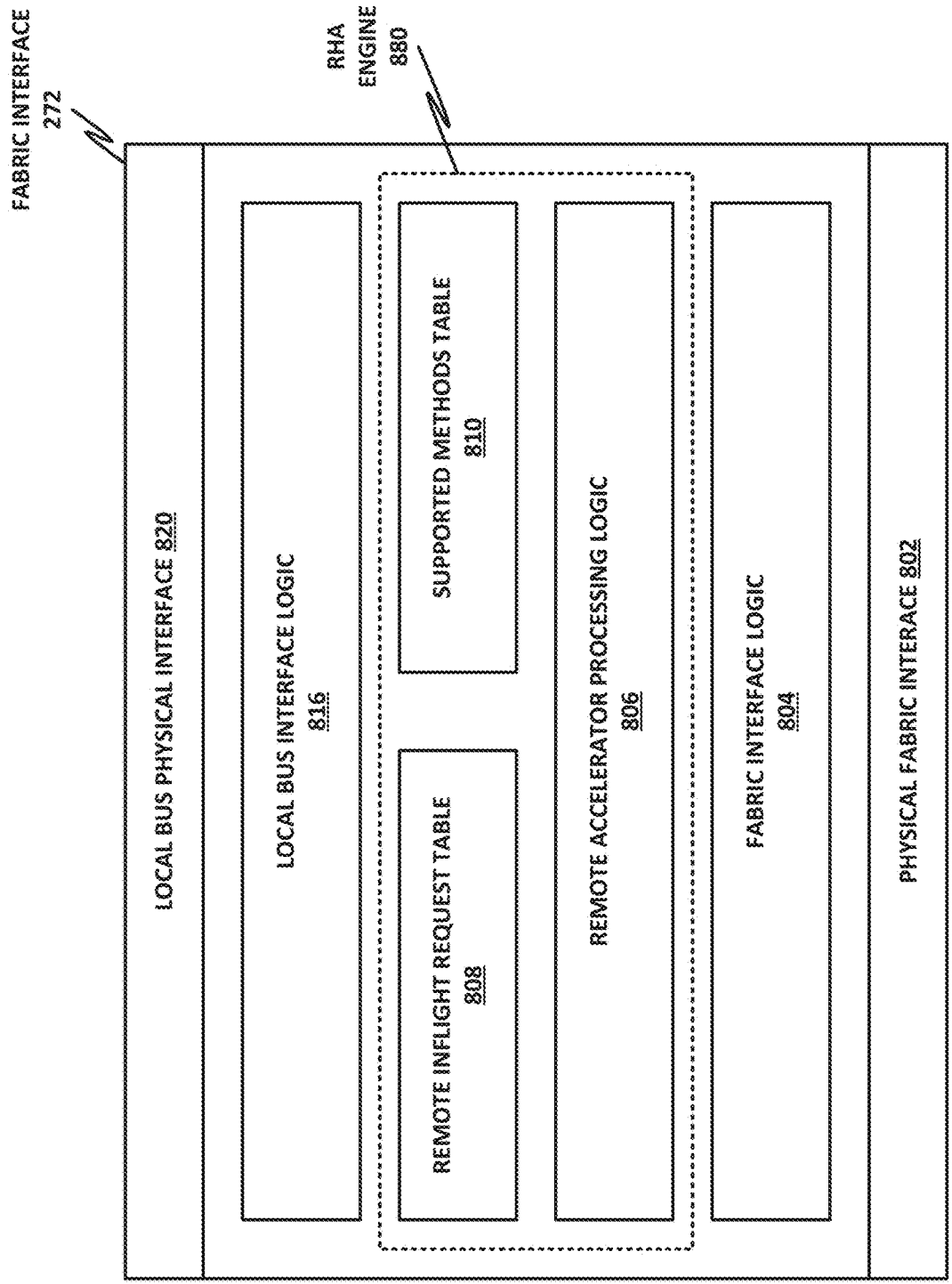
FIG. 8 is a block diagram of an example host fabric interface (HFI) according to one or more examples of the present specification.

FIG. 8 is a block diagram of an example HFI 272 according to one or more examples of the present specification. This HFI 272 is provided by way of nonlimiting example only. It should be noted in particular that HFI 272 may be a separate pluggable card, such as a PCIe card, or it may be tightly integrated and on-die with its host core. Furthermore, while HFI 272 is disclosed herein as the medium for hosting remote hardware acceleration functions, these functions could just as well be hosted in another part of the machine. For example, a dedicated RHA chip could be provided, which itself could be very much like a hardware accelerator. Functions could be performed on a hardware block integrated into the core, or these functions could be performed in software on the core. Thus, the disclosure of remote hardware acceleration functions on HFI 272 in this figure should be understood as a nonlimiting and illustrative example only, and the present disclosure should be understood to encompass any suitable hardware or software configuration for realizing remote hardware acceleration.

In this example, HFI 272 includes two physical interfaces, namely a local bus physical interface 820 and a physical HFI 802.

Local bus interface 820 may provide a physical interface to a local bus on the host, such as a PCIe interface or other local interconnect. Local bus physical interface 820 is provided as a nonlimiting example, and it should be understood that other interconnect methods are possible. For example, in cases where HFI 272 is tightly coupled with its accompanying core, local bus physical interface 820 could be direct, on-die trace lines, or direct copper connections on an integrated circuit board. In other examples, a bus interface other than PCIe could be used.

Physical HFI 802 provides the physical interconnect to a fabric, such as fabric 170 of FIG. 1 or any of the fabrics disclosed herein. Physical HFI 802 may be configured to connect HFI 272 to any suitable fabric.

In one particular example, Intel® Omni-Path™ fabric may be used. The Omni-Path™ fabric is advantageous because it allows mapping of addresses and memory ranges between different coherent domains. A system may include one or more coherent domains wherein all coherent domains are connected to each other via a fabric. Caching agents are the coherency agents within a node that process memory requests from cores within the same node, thus providing the coherency of the domain. Home agents are node clusters that are responsible for processing memory requests from the caching agents, and act as a home for part of the memory address space. A single die may have multiple homes, having a distributed address space mapping. Depending on the address space that the request targets, the request may go to the same node's local memory or they may go to a UPI agent, for example, to route the request to other processors within the same coherent domain. Alternately, a request may go through the HFI 272 to processors that are outside the coherent domain. All processors connected via the UPI belong to the same coherent domain. Thus, HFI 272 may communicate with an Omni-Path™ fabric via UPI tunneling.

This communication may be facilitated via HFI logic 804, which provides logic elements and instructions necessary to provide communication within a coherent domain, and across the fabric with different coherent domains. HFI logic 804 may also include logic to translate local requests into remote fabric requests.

On the other hand, local bus interface logic 816 may provide logic for interfacing with the local bus, such as a PCIe bus, or a dedicated copper connection. Alternately, traffic through HFI 272 may follow a path through local bus physical interface 820, local bus interface logic 816, HFI logic 804, and physical HFI 802 out to the fabric.

Other elements of HFI 272 may constitute a remote hardware acceleration (RHA) engine 880. RHA engine 880 includes the logic and data necessary to perform the RHA methods disclosed in this specification.

For example, RHA engine 880 includes remote accelerator processor logic 806. This block may be configured to receive RHA requests from within the host, and appropriately translate them to packets that can be sent out via the fabric. For example, remote accelerator processing logic 806 may provide interfaces that make remote hardware accelerators appear to be local resources to the host of HFI 272. Remote accelerator processing logic 806 encapsulates any functions required to perform the actual RHA transaction, and insulates the host core from the need to be aware of the RHA architecture.

In cases where the host of HFI 272 includes a remotely accessible hardware accelerator, remote accelerator processing logic 806 may include logic to register the hardware accelerator with an orchestrator, and may include logic to receive incoming requests, and direct them to the appropriate hardware accelerator.

In the registration process, each hardware accelerator with RHA capabilities may register to its respective HFI the memory operation supported by the accelerator. This information may be stored locally in the HFI, and may be accessed by remote nodes via a fabric flow. This flow may allow an application to discover if an acceleration operation or a list of operations are currently supported by a given node, with or without the aid of an orchestrator. The remote HFI may respond with the memory operations that each of the accelerators supports. Alternatively, all of the operations supported by the remote node could be requested. Note that there are existing mechanisms for mapping and discovering remote resources, such as system address decoders that can be used to perform mapping and expose information to applications.

In this example, a remote in-flight request table 808 is also provided. Remote in-flight request table 808 holds the in-flight remote requests that have been sent to the local hardware accelerator.

RHA engine 880 also includes a supported methods table 810. This table holds information about which operations are supported by local accelerators, and the corresponding metadata for those operations. The metadata may include parameters that the operation provides, and data that it may return. In certain embodiments, metadata content can be extended relative to what is currently available. Supported methods table 810 may be used in the registration process to register the local hardware accelerator, and to notify the orchestrator of the appropriate interface, so that the orchestrator can update its RAAT table.

In certain examples, the fabric protocol may be extended to support novel messages to convey the remote accelerator and discovery requests. In one example, these new messages are implemented on top of the L4 network layer so that no changes are required in lower layers. Novel extensions may also be introduced to the accelerators themselves. For example, a DMA accelerator may be extended to register to the HFI which memory operations are supported. Each operation may have its own universally unique identifier (UUID), which may be similar to CPUID values. At reset time, the memory controllers or pcode may register to the HFI which operations are supported by each of the accelerators, and the memory in the local node. Each operation UUID may have an associated set of parameters that each application knows up front. This is similar to the CPUID, and each UUID may have a unique definition in terms of what the operation does, and what operands and parameters are accepted.

Furthermore, software libraries may be extended to expose mechanisms to the application to discover which features each of the nodes and their accelerators support. Libraries may access the discovery mechanism exposed by the HFI to discover which features are exposed by the different memory controllers in a scale out architecture.

In certain embodiments, the system software stack in the orchestrator may be responsible to set up the memory address space across the data center and ensure that applications can discover and understand the memory mapping for remote nodes where accelerators are hosted, and where the accelerator operations are executed.

Figure 9:
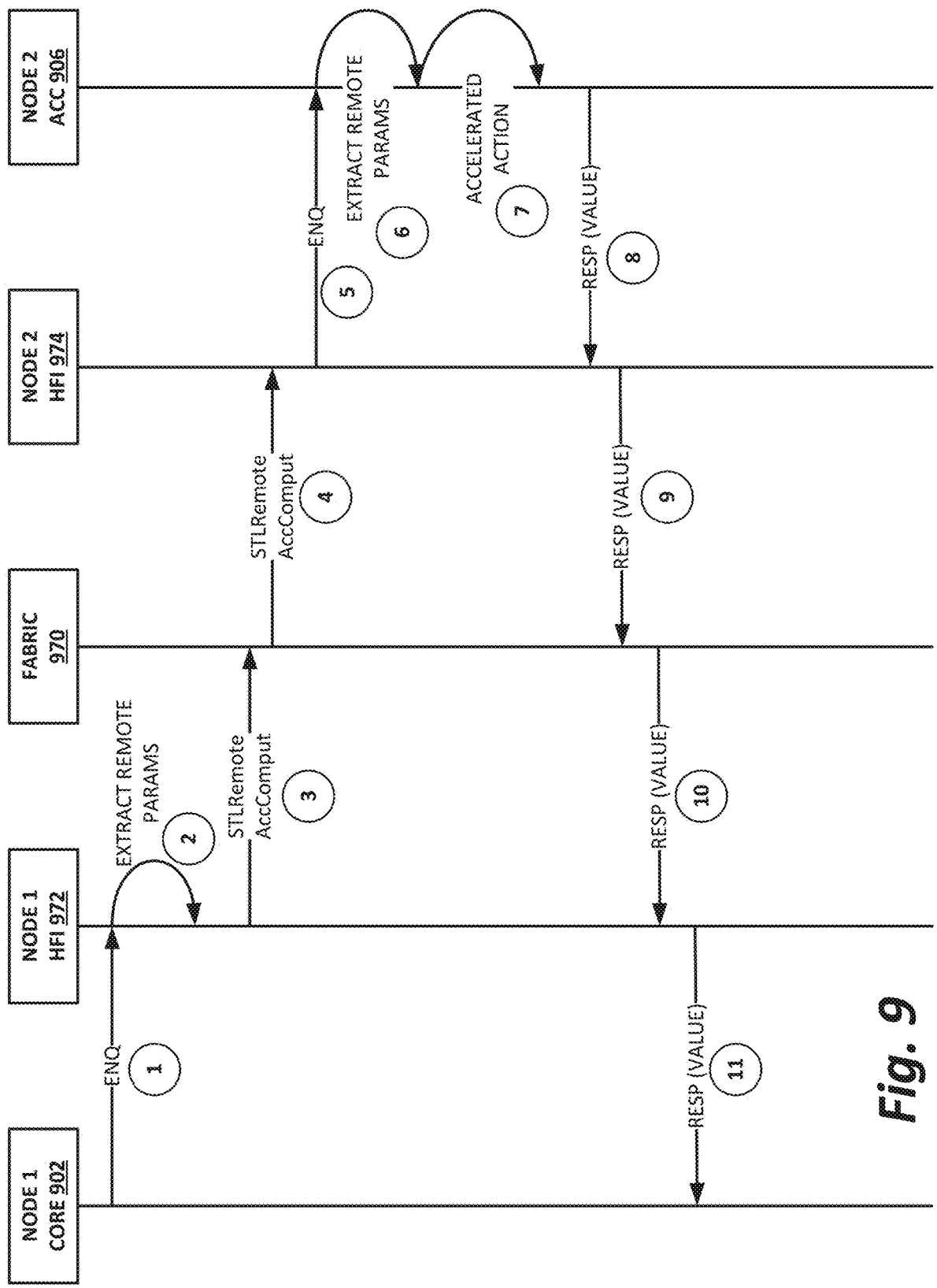
FIG. 9 is a flow diagram illustrating an example of a remote hardware acceleration request according to one or more examples of the present specification.

FIG. 9 is a flow diagram illustrating an example of a remote hardware acceleration request according to one or more examples of the present specification. In this case, it is assumed that node 1, including core 902 and HFI 972 is connected to fabric 970. Node 1 may require remote hardware acceleration services.

Node 2, including node 2 accelerator 906 and node 2 HFI 974 also communicatively couples to fabric 970. It is assumed in this example that node 2 has registered via HFI 974 the capabilities of accelerator 906.

At operation 1, node 1 core 902 issues an ENQ command. Specifically, the application generates a descriptor command providing the memory address where the parameters for the remote memory operation are stored. By way of example, the following parameters may be considered:
    a. The target node hosting the accelerator.
    b. The operation to perform.
    c. Parameters defined by the operation:
      i. Result or destination address.
      ii. Sourced data addresses.
      iii. Other parameters required by the accelerator agent to execute the operation.

The ENQ command is sent across the on-die interconnect or the local interface bus (such as PCIe) from core 902 to HFI 972.

At operation 2, HFI 972 extracts the appropriate remote parameters from the command.

At operation 3, HFI 972 sends an Omni-Path™ accelerator compute message via fabric 970.

At operation 4, fabric 970 propagates the Omni-Path™ remote accelerator compute command to node 2 HFI 974.

In block 5, HFI 974 receives the command, and sends an ENQ UPI command to accelerator 906, including the specified parameters, if any. It may be assumed that HFI 974 has a mechanism to know which agent and the node is the target of the request in the case that there is more than one hardware accelerator agent in the node. A system such as one similar to a system address decoder may be used for this purpose. HFI 974 generates the ENQ command to the accelerator.

At operation 6, the accelerator 906 extracts the parameters that are pointed to by the memory descriptor. The reads generated to the descriptor may hit the cache of HFI 974, which may have previously acquired ownership.

In operation 7, the accelerator performs the requested operation. Depending on the nature of the operation, a response value may be required. For example, if the operation is a cryptography operation, then the encrypted packet may need to be returned. On the other hand, if the operation is a bulk memory move, then a simple ACK may suffice.

In operation 8, accelerator 906 propagates to HFI 974 the response to the accelerated action, including as necessary a payload including the computed value.

In operation 9, HFI 974 propagates the response to fabric 970.

In operation 10, fabric 970 propagates the response to HFI 972.

In operation 11, HFI 972 propagates the response to core 902. Software running on core 902 may then handle the response and use the return payload as is appropriate to the application.

It should be noted in the flow above that there is an assumption that the RHA command contains the parameters and the operation to apply. However, in certain embodiments, if the parameters that the memory device expects are different, the flows may be extended to convey the extra parameters.

It should also be noted that if the target HFI 974 does not support the requested flow, or the memory references do not match to an accelerator implementing the accelerated operation, a NAK may be generated and propagated back to the requesting core 902. The requesting core 902 may then generate an interrupt to provide a notification of the error.

Figure 10:
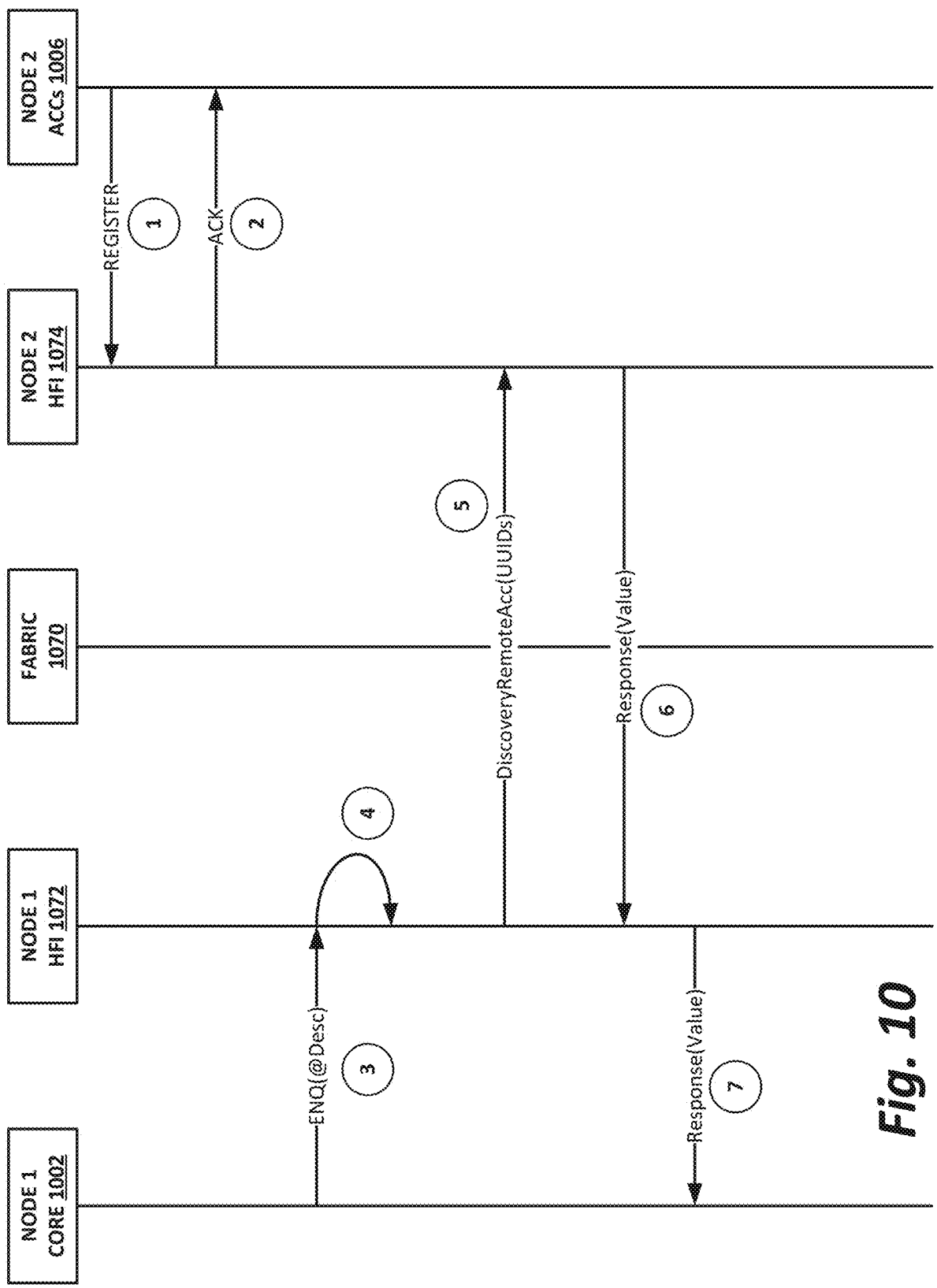
FIG. 10 is a signal flow diagram of discovery of accelerators in a peer-to-peer fashion, wherein it is not necessary for accelerators to register with an orchestrator or other network controller.

FIG. 10 is a signal flow diagram of discovery of accelerators in a peer-to-peer fashion, wherein it is not necessary for accelerators to register with an orchestrator or other network controller. In the example of FIG. 10, the various nodes may be arranged in a peer-to-peer fashion, and discovery of accelerators may be on a democratic basis. In this example, node 1 including core 1002 and fabric interface 1072 discovers a remote accelerator on node 2 including fabric interface 1074 and accelerators 1006.

In this example, the HFI, fabric flows, and memory controller may all be extended to provide a method for applications to discover which accelerator functions are available on a given node, and for accelerators on a node to expose that functionality to other nodes.

In this example, each of the node's memory agents or pcodes may register to their HFIs the UUID memory operations supported by the accelerator. For example, in operation 1, accelerators 1006 register to HFI 1074. This registration may be via a memory agent or a pcode, and may include registering the UUID for a memory operation supported by the various accelerators. Note that accelerators 1006 may include more than one accelerator.

In operation 2, HFI 1074 sends an ACK back to accelerators 1006. Note that if multiple accelerators are provided, then multiple ACKs may be provided as well.

In operation 3, an application on core 1002 of node 1 wishes to discover if an acceleration operation is available, or to retrieve a list of operations that are currently supported by node 2. In this example, at operation 3, core 1002 sends an inquiry to HFI 1072, including a description of the accelerators that it wishes to discover.

In operation 4, HFI 1072 extracts remote query parameters from the inquiry.

In operation 5, HFI 1072 sends to HFI 1074 a request such as "discover remote accelerators," with a parameter of the UUIDs that it wishes to discover. Note that this may include a single UUID, multiple UUIDs, or a request to return all available supported UUIDs. Thus, core 1002 can discover specific accelerators supported by node 2, or may discover any available accelerators.

In operation 6, HFI 1074 responds to HFI 1072 with a response, including the value of one or more UUIDs indicating memory operations supported by accelerators 1006.

At operation 7, HFI 1072 returns the response to core 1002.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes an HFI apparatus, comprising: a fabric interface to communicatively couple to a fabric; and a remote hardware acceleration (RHA) engine to: query an orchestrator via the fabric to identify a remote resource having an accelerator; and send a remote accelerator request to the remote resource via the fabric.

Example 2 includes the HFI apparatus of example 1, wherein querying the orchestrator comprises receiving an interface format for the remote accelerator request.

Example 3 includes the HFI apparatus of example 1, wherein the HFI apparatus is on-chip with at least one core.

Example 4 includes the HFI apparatus of example 1, further providing a local bus interface to communicatively couple the HFI apparatus to a host.

Example 5 includes the HFI apparatus of any of examples 1-4, wherein the remote hardware acceleration (RHA) engine is to: register the accelerator with an orchestrator; receive via the HFI a remote accelerator access request from a remote node; perform an accelerated action according to the remote accelerator access request; and send a result to the remote node via the HFI.

Example 6 includes the HFI apparatus of example 5, wherein the result comprises an ACK.

Example 7 includes the HFI apparatus of example 5, wherein the result comprises a payload.

Example 8 includes a computing system comprising a processor, a memory, and the HFI of example 1.

Example 9 includes a system on a chip comprising a processor and the HFI of example 1.

Example 10 includes an integrated circuit comprising a processor and the HFI of example 1.

Example 11 includes a multi-chip package comprising a processor, support circuitry, and the HFI of example 1.

Example 12 includes one or more tangible, non-transitory computer-readable storage mediums having stored thereon instructions for providing a remote hardware acceleration (RHA) engine to: query an orchestrator via a fabric to identify a remote resource having an accelerator; and send a remote accelerator request to the remote resource via the fabric.

Example 13 includes the one or more tangible, non-transitory computer readable mediums of example 12, wherein querying the orchestrator comprises receiving an interface format for the remote accelerator request.

Example 14 includes The one or more tangible, non-transitory computer readable mediums of example 12, wherein the remote hardware acceleration (RHA) engine is to: register a local accelerator with an orchestrator; receive via the fabric a remote accelerator access request from a remote node; perform an accelerated action according to the remote accelerator access request; and send a result to the remote node via the fabric.

Example 15 includes the one or more tangible, non-transitory computer readable mediums of example 14, wherein the result comprises an ACK.

Example 16 includes the one or more tangible, non-transitory computer readable mediums of example 14, wherein the result comprises a payload.

Example 17 includes a computer-implemented method for providing a remote hardware acceleration (RHA) engine, comprising: querying an orchestrator via a fabric to identify a remote resource having an accelerator; and sending a remote accelerator request to the remote resource via the fabric.

Example 18 includes the method of example 17, wherein querying the orchestrator comprises receiving an interface format for the remote accelerator request.

Example 19 includes the method of example 17, further comprising: registering a local accelerator with an orchestrator; receiving via the fabric a remote accelerator access request from a remote node; performing an accelerated action according to the remote accelerator access request; and sending a result to the remote node via the fabric.

Example 20 includes the method of example 17, wherein the result comprises an ACK.

Example 21 includes the method of example 17, wherein the result comprises a payload.

Example 22 includes an apparatus comprising means for performing the method of any of examples 17-21.

Example 23 includes the apparatus of example 22 wherein the means comprise a processor and a memory.

Example 24 includes the apparatus of example 22, wherein the means comprise an RHA circuit.

Example 25 includes the apparatus of example 24, wherein the RHA circuit is embodied in a fabric interface.

Example 26 includes the apparatus of example 25, wherein the fabric interface is tightly coupled with a host processor.

Example 27 includes the apparatus of example 25, wherein the fabric interface is on-die with a host processor.

Example 28 includes the apparatus of example 25, wherein the fabric interface comprises a local bus to communicatively couple to a host processor.

Example 29 includes an orchestrator, comprising: a processor; a memory; an HFI; a remotely accessible accelerator table (RAAT); and a remote hardware acceleration registration (RHAR) engine to: receive via the HFI a registration request to register a remotely accessible accelerator; and populate the RAAT with data about the remotely accessible accelerator.

Example 30 includes the orchestrator of example 29, wherein the data about the remotely accessible accelerator comprises an identifier for a host of the remotely accessible accelerator.

Example 31 includes the orchestrator of example 29, wherein the data about the remotely accessible accelerator comprises interface information for the remotely accessible accelerator.

Example 32 includes the orchestrator of example 29, wherein the RHAR engine is further to: receive via the HFI a discovery request for remote acceleration; query the RAAT; and return via the fabric information about the remotely accessible accelerator.

Example 33 includes the orchestrator of example 29, wherein the information about the remotely accessible accelerator comprises interface information for the remotely accessible accelerator.

Example 34 includes a computing apparatus, comprising: one or more cores; a memory; a fabric interface; and remote hardware acceleration (RHA) engine to: query an orchestrator via the fabric to identify a remote resource having an accelerator; and send a remote accelerator request to the remote resource via the fabric.

Example 35 includes the computing apparatus of example 34, wherein querying the orchestrator comprises receiving an interface format for the remote accelerator request.

Example 36 includes the computing apparatus of example 34, wherein the RHA engine is provided in the fabric.

Example 37 includes the computing apparatus of example 36, wherein the fabric is on-chip with at least one core.

Example 38 includes the computing apparatus of example 36, wherein the fabric interconnects with at least one core via a local bus.

Example 39 includes the computing apparatus of any of examples 34-38, further comprising an accelerator; wherein the remote hardware acceleration (RHA) engine is to: register the accelerator with an orchestrator; receive via the fabric interface a remote accelerator access request from a remote node; perform an accelerated action according to the remote accelerator access request; and send a result to the remote node via the fabric interface.

Example 40 includes the computing apparatus of example 39, wherein the result comprises an ACK.

Example 41 includes the computing apparatus of example 39, wherein the result comprises a payload.

What is claimed is:

1. A network interface controller (NIC), comprising:
  a fabric interface to communicatively couple to a fabric; and
  stored instructions to instruct the NIC to:
    query an orchestrator via the fabric to identify a remote resource having a graphics processing unit (GPU) or field-programmable gate array (FPGA) accelerator physically remote from the NIC;
    receive a remote accelerator request that matches to the remote resource; and
    send the remote accelerator request to the remote resource via the fabric.

2. The NIC of claim 1, wherein querying the orchestrator comprises receiving an interface format for the remote accelerator request.

3. The NIC of claim 1, wherein the NIC is on-chip with at least one core.

4. The NIC of claim 1, further providing a local bus interface to communicatively couple the NIC to a host.

5. The NIC of claim 1, wherein the remote hardware acceleration (RHA) engine is the instructions are further to:
  register the accelerator with an orchestrator;
  receive via the NIC a remote accelerator access request from a remote node;
  perform an accelerated action according to the remote accelerator access request; and
  send a result to the remote node via the NIC.

6. The NIC of claim 5, wherein the result comprises an acknowledgement (ACK).

7. The NIC of claim 5, wherein the result comprises a payload.

8. A computing system comprising a processor, a memory, and the NIC of claim 1.

9. A system on a chip comprising a processor and the NIC of claim 1.

10. An integrated circuit comprising a processor and the NIC of claim 1.

11. A multi-chip package comprising a processor, support circuitry, and the NIC of claim 1.

12. One or more tangible, non-transitory computer-readable storage mediums having stored thereon instructions for providing a remote hardware acceleration (RHA) engine of a network interface controller, the instructions to:
  identify one or more available remote resources, comprising querying an orchestrator via a fabric to identify a remote resource physically remote from a host and having a graphics processing unit (GPU) or field-programmable gate array (FPGA) accelerator; and
  send a remote accelerator request to the remote resource via the fabric.

13. The one or more tangible, non-transitory computer readable mediums of claim 12, wherein querying the orchestrator comprises receiving an interface format for the remote accelerator request.

14. The one or more tangible, non-transitory computer readable mediums of claim 12, wherein the remote hardware acceleration (RHA) engine is to:
  register a local accelerator with an orchestrator;
  receive via the fabric a remote accelerator access request from a remote node;
  perform an accelerated action according to the remote accelerator access request; and
  send a result to the remote node via the fabric.

15. The one or more tangible, non-transitory computer readable mediums of claim 14, wherein the result comprises an ACK.

16. The one or more tangible, non-transitory computer readable mediums of claim 14, wherein the result comprises a payload.

17. A computer-implemented method for providing a remote hardware acceleration (RHA) engine on a smart network interface controller (NIC), comprising:
  querying an orchestrator via a fabric to identify a remote resource having an accelerator, the accelerator being physically remote from a host and including a field-programmable gate array (FPGA) and/or graphics processing unit (FPGA); and sending a remote accelerator request to the remote resource via the fabric.

18. The method of claim 17, wherein querying the orchestrator comprises receiving an interface format for the remote accelerator request.

19. The method of claim 17, further comprising:
registering a local accelerator with an orchestrator;
receiving via the fabric a remote accelerator access request from a remote node;
performing an accelerated action according to the remote accelerator access request; and
sending a result to the remote node via the fabric interface NIC.

20. An orchestrator, comprising:
a processor;
a memory;
a network controller to communicatively couple the orchestrator to a network fabric;
a remotely accessible accelerator table (RAAT); and
a remote hardware acceleration registration (RHAR) engine instructions encoded within the memory to instruct the processor to:
allocate a table;
receive via the network controller a registration request to register a remotely accessible accelerator to provide acceleration via a field-programmable gate array (FPGA) or graphics processing unit (GPU), wherein the remotely accessible accelerator is accessibly by a first host being physically remote from a second host that includes the remotely accessible accelerator; and
populate the table with data about the remotely accessible accelerator.

21. The orchestrator of claim 20, wherein the data about the remotely accessible accelerator comprises an identifier for a host of the remotely accessible accelerator.

22. The orchestrator of claim 20, wherein the data about the remotely accessible accelerator comprises interface information for the remotely accessible accelerator.

23. The orchestrator of claim 20, wherein the RHAR engine is the instructions are further to:
receive via the NIC a discovery request for remote acceleration;
query the table; and
return, via the network fabric, information about the remotely accessible accelerator.

24. The orchestrator of claim 23, wherein the information about the remotely accessible accelerator comprises interface information for the remotely accessible accelerator.

25. The NIC of claim 1, wherein the physically remote GPU or FPGA is communicatively coupled to the NIC via a fabric.

* * * * *